May 16, 1950     S. D. LAWSON     2,507,604
METHOD FOR WATER DISTRIBUTION OVER COOLING COILS
Filed Aug. 6, 1945

INVENTOR
S. D. LAWSON
BY Hudson & Young
ATTORNEYS

Patented May 16, 1950

2,507,604

UNITED STATES PATENT OFFICE 2,507,604

METHOD FOR WATER DISTRIBUTION OVER COOLING COILS

Shelby D. Lawson, Bartlesville, Okla., assignor to Phillips Petroleum Company, a corporation of Delaware Application August 6, 1945, Serial No. 609,219

4 Claims. (Cl. 257—183)

This invention relates to cooling towers. In one of its more specific aspects it relates to an improved cooling tower construction whereby a more efficient distribution of cooling water is obtained.

The modern cooling tower finds use in a great many industrial installations. The original cooling pond, and later water sprays in conjunction with the cooling pond served the needs of industrial plants for many years. In this latter case the pond served mainly as a storage reservoir for the spray cooled water. While this open spray type cooler served well to furnish cool water for many purposes, it has been found more efficient and economical to use coolers and cooling means of such a type which came to be known as cooling towers. The original and even today many cooling towers depend merely upon spraying of water within the tower into a natural draft of air to produce cooling water. Some towers employ a forced draft of air. Other towers and especially those of more recent design, in addition to cooling the water by evaporation, are provided with coils for indirectly contacting the hot material to be cooled with the cooled water. It is this latter type of cooling tower to which my invention is directed. Specifically, it is directed to an improved means for producing a more effective distribution of cooled water over the heat exchange coils.

One object of my invention is to provide a more effective cooling tower for use in cooling large quantities of hot fluids.

Another object of my invention is to provide means for more efficient use of the cooling water without increasing its circulation rate in cooling towers.

Yet another object of my invention is to provide an improved method for the distribution of water over cooling coils inside cooling towers.

Still other objects and advantages will be apparent to those skilled in the art from a study of the following detailed disclosure in which Figure 1 illustrates diagrammatically one form of my invention showing the construction and installation of my adjustable water spreading tray.

Figure 1:
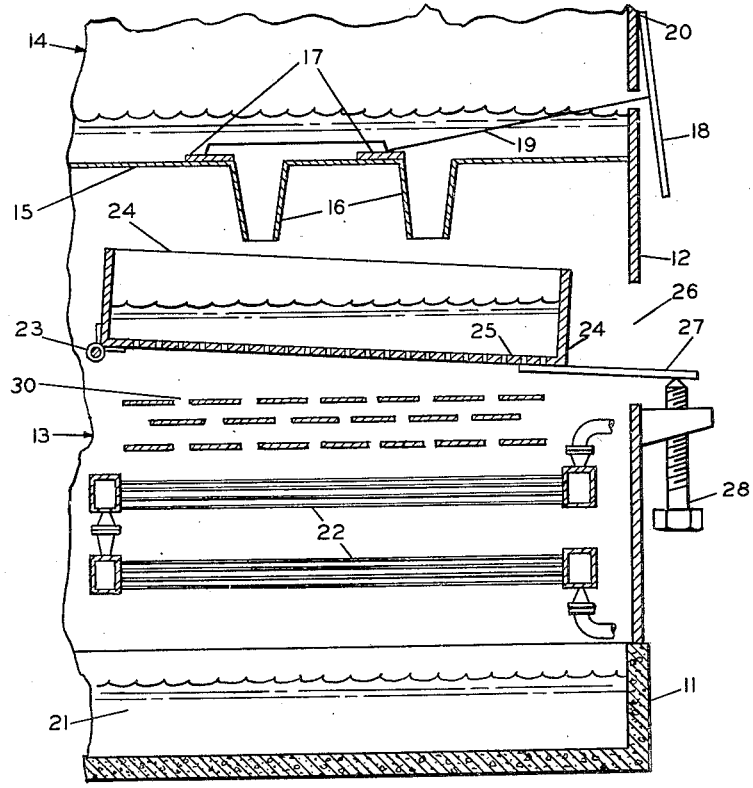

Referring to the drawing and particularly to Figure 1 a cooling tower assembly, in part, is shown. This assembly is composed of a concrete basin 11 and wooden side walls 12. The tower structure is divided into two main sections, the lower or heat exchange section 13 and the upper or water cooling section 14. Separating these two main sections is a wooden partition or separator 15. This wooden partition or separator is substantially a water tight floor having down spouts 16 for directing the flow of cooled water from the upper water cooling section to the lower heat exchange section. Slide valves 17 are operated by a hand lever 18 and push-and-pull rod 19. The hand lever is pivoted at 20 so that by pulling the lever in a direction away from the wall 12 the valve plates 17 cover in part or fully cover the down spout openings 16, as desired, and thereby regulate the amount of water permitted to flow from the water cooling section 14 into the heat exchange section 13. For conventional sized cooling towers employed in big scale plant operations the downspouts 16 may be from 6 to 10 inches in diameter and the depth of water on the floor 15 of the water cooling section may be from 10 to 18 inches, commonly from 12 to 15 inches. Water sprays, not shown, are installed within this upper section to cool the water by evaporation, which sprays and installation of same is conventional in cooling tower construction. Large fans for forcing air through this upper section are also not shown for purposes of simplicity. Such cooling towers are termed "induced draft" cooling towers.

The lower or "heat exchange" section of the tower has the large water basin or reservoir 21, cooling or condenser coils 22, water spreader slats 30 and water distributor box 24. These condenser or cooling coils may be the "Coy sections," commonly used in cooling tower construction. The fluid conducting heat exchange tubes are preferably made of corrosion resistant metal having a high conductivity for heat.

The wooden water spreader slats 30 may be of such width as to assure proper dispersion of water as it flows from the bottom of the distributor box so as to maintain uniform distribution of water in contact with the cooling coils.

In construction of cooling towers, it is common practice to install such elements as the cooling coils 22, slats 30 and distributor box 24 as rigid and fixed in position as possible. Such positions are ordinarily "level" or substantially so. As far as the specific installation is concerned, however, the condenser coils need not be exactly level since fluid passing therethrough for cooling or condensation is usually maintained under pressure. However, the slats 30 should preferably be substantially level since the water which passes over them will be more nearly evenly distributed over the cooling coils, and it is axiomatic that an even distribution of water produces more efficient cooling.

I have found that when the distributor box 24 is horizontally disposed there may or may not be uniform flow of water through all portions of the perforated bottom of the box. However, the spreader slats 30 do much toward distributing any uneven water flow. In normal operations it is common practice to make and assemble the distributor box and the slats in such a manner as to obtain as nearly as possible equal distribution of water flowing over the cooling coils. I have now found that the equal distribution of water over the cooling coils is not necessarily the condition yielding the most efficient cooling. I have further found that a point in the coil having a higher temperature requires a greater volume of cooling water to prevent unbalanced coil operation.

Figures 2, 3:
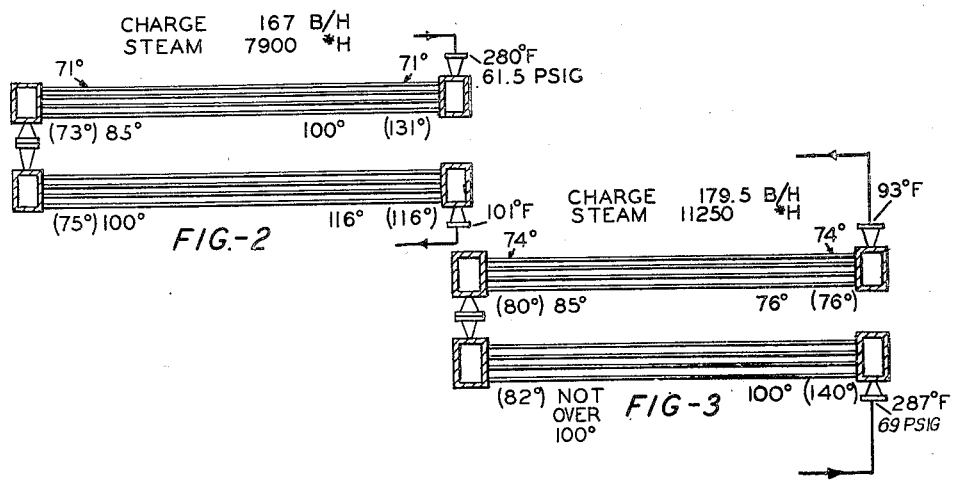
Figure 2 shows cooling water and material temperatures adjacent a cooling coil when using a fixed water distribution tray in contrast to the use of my adjustable water distributor, with material being cooled flowing downward through the coil concurrently with the cooling water.
Figure 3 shows a comparison similar to that shown in Figure 2 excepting that the material flows from bottom to the top of the cooling coil countercurrently to the flow of the cooling water.

On referring now to Figures 2 and 3 of the drawing the numerals in parentheses are temperatures in degrees Fahrenheit of the cooling water at various points adjacent the cooling coils when the water distributing box 24 is disposed in a horizontal position. In Figure 2 with material entering the cooling coil at 280° F. and 61.5 pounds pressure per square inch and cooling water at 71° F., the water is warmed from 71° to 131° F. At the opposite end of the first "Coy section" the water is heated from the original temperature of 71° F. to 73° F. On passing into the second "Coy section" the 73° F. water is further warmed to 75° F. Then at the final point of this coil the water registers 116° F., which temperature is 15° lower than the water coming to this latter point. The increase in temperature from 71° F. to 131° F. is too great an increase and indicates too small a volume of cooling water at this point. At the opposite end of this coil the water temperature increased from 71° F. to 73° F. to 75° F., which increases are, for best operation, not sufficiently large. At this point there appears to be too great a quantity of cooling water for the amount of hot material to be cooled. With a large excess of cooling water, then, the material within the coil may become overcooled. Overcooling was evident since the 131° F. cooling water was actually cooled to 116° F. at the final point in the coil, thus the material to be cooled was at a temperature considerably less than 131° F., since this material on passing in heat exchange with the 131° F. water actually cooled the water to 116° F. and finally passed out of the coil at 101° F.

I have found that this situation can be remedied by the application of my invention as herein described. To correct the ill it is necessary to cause more cooling water to flow over the cooling tubes at the inlet-outlet end of this exchanger coil. In order to cause more water to flow over this end of the coil, I have installed the distribution box in a special and adjustable manner in the cooling tower. In place of rigidly attaching the box to supporting members within the tower, I support one end by means of a pivot or hinge 23, to a fixed support within the tower, not shown. Then the opposite end of the box is accordingly made adjustable to be raised or lowered as desired.

Thus a board or piece of metal 24 of sufficient strength and length is rigidly attached to the box at point 25 and this board or piece of metal extends through an opening 26 in the side wall 12 of the cooling tower. On the underside of this extended member is an adjustable screw or other suitable means for varying the height of this extended member. Thus by turning the screw in such direction as to raise the end of the extended member 27, this end of the distributing box raises and the water in the box tends to run to the opposite end. What actually happens when this extended end of the box is raised slightly is the head of water in this end of the box is decreased some resulting in decreased flow through the bottom perforations at this point. Thus by raising member 27 the flow of water over the inlet-outlet end of the coil of Figure 2 is decreased and the flow of water over the opposite end of the coil is accordingly increased due to its increase of head in the pivoted end of the distribution box. This particular operation is the opposite from that required to remedy the excessive temperature increased from 71° to 131° F. and decrease to 116° F. Thus, to correct this abnormal condition I merely turn screw 28 to lower its upper end and accordingly to lower this end of the distributing box which lowering increases the head of water and therefore increases the flow over this end of the coil.

When the coil of Figure 2 is operating with a deficiency of water at the outlet-inlet end the temperatures within the parentheses were the cooling water temperatures. Then by turning screw 28 to lower this end of the water distribution box and accordingly increasing the water flow at this point with a decrease at the opposite end, then the temperature values not included within parentheses were taken. These temperatures are representative of good operation. Considerable cooling of material occurs when the water temperature goes from 71° F. to 100° F. Then further substantial cooling occurs at the next point of flow of the material and this is evidenced by the cooling water being warmed from 71° F. to 85° F. Further cooling then occurs by heating the 85° F. water to 100° F. and the final exchange cools the oil to 101° F. and the water temperature increases from 100° to 116° F. These several water temperature changes have been found to provide effective heat exchange between the water and the hot oil to be cooled.

No temperature in this improved operation illustrated in Figure 2 is sufficiently high to cause scale formation on the exchanger tubes. In the improper operation wherein one water temperature was 131° some slight scale was deposited on the tubes over a long period of time. It is obvious that the deposition of lime scale from bicarbonate on exchanger tubes causes poor heat exchange and is to be avoided by all means.

This operation explained above is a concurrent exchange operation since the original cooling water contacts in heat exchange the hot oil first, and the finally cooled oil and the fully warmed water leave the coils at substantially the same point.

The illustration given in Figure 3 of the drawing is one of substantially countercurrent operation in which the fully cooled cooling water contacts the partly cooled oil prior to its exit from the coil. In this figure the water temperature increase from 76° to 140° F. is in reality too large indicating a small flow of water over this end of the coil. At the temperature of 140° F. a lime precipitate frequently deposits on the exchanger pipes resulting in decreased and inefficient cooling. Thus to remedy this situation I merely lower the screw 28 to permit more water to flow over the inlet-outlet end of the coil and some water over the opposite end of the coil. A decrease in the rate of flow of water at this latter point causes a greater increase in the temperature of the water than when a large excess of water flows. The 2° F. temperature change at the oil outlet end of the exchanger of this Figure 3 is normal and indicates that most of the cooling had already occurred prior to this point.

One point to be noted is that the countercurrent operation of Figure 3 results in a more efficient heat exchange as will be evidenced by observation of the temperature of the cooled oil. In the countercurrent case of Figure 3 the hot oil feed was at 287° F. and issued at 93° F. while in the concurrent operation of Figure 1 the hot oil entered at 280° F. and left at 101° F.

In further support of countercurrent cooling of Figure 3 a larger volume of oil vapor (179.5 liquid barrels per hour) and steam (11,250 pounds per hour) were cooled than in the concurrent operation of Figure 2 in which 167 barrels liquid oil as vapor and 7,900 pounds of steam per hour were cooled to only 101° F.

I have found that by operating according to the temperature in parentheses shown on the Figures 2 and 3 on a certain cooling tower that 3 water circulation pumps each having a capacity of 3,500 gallons per minute and representing a total water circulation rate of 10,500 gallons per minute are required. Then by installing my adjustable water distributing boxes and properly adjusting them, permits discontinuance of the use of one of said circulating water pumps. Thus the water recirculation rate was decreased from 10,500 gallons per minute to 7,000 gallons per minute. This operation resulted in the saving of 150 horsepower per hour which is the power required to operate a 3,500 gallon per minute pump.

Materials of construction of cooling towers are well defined and known to engineers designing and building such equipment. The pivot member of my water distribution box should preferably be made of a corrosion resistant, rust proof metal so that it will be free to move under the wet and humid conditions within such an apparatus. The water distribution box is usually constructed of wood, possibly redwood or other wood which will withstand wet and moist conditions. Distribution boxes are usually supported at a number of points since such boxes and cooling coils are frequently rather long, for example, 20 feet. The temperature data shown in Figures 2 and 3 were for condenser coils 20 feet in length.

To support wooden water distribution boxes of such length, rigid supports such as angle iron members should be attached to the underside thereof. One means of providing the member 27 of Figure 1 is to extend two angle iron supporting members through the wall opening 26 and connecting the outer ends with a metallic cross member. It will then be this cross member which rests on the adjustable screw means 28. These angle iron supports of corrosion resistant material are merely a suggestion since a distribution box of 20 feet or more in length can be made sufficiently rigid to carry its own dead weight and its water load weight by any means desired and yet come within the scope of my invention.

Likewise, the use of a screw arrangement for raising and lowering the movable end of the distribution box is merely a suggestion since any means adapted to support the member 27 and capable of rather fine adjustment will be suitable. I suggest the use of a screw member since I have found that it operates in a very satisfactory manner.

The cooling section of the tower need not necessarily be built at the top of the cooling tower structure as herein described, since the water cooling may be carried out by any suitable means as by a spray pond or other cooling methods. In such cases the cooled water is pumped directly into my adjustable distribution boxes and their adjustment and operation are the same as herein before described.

The pivot 23 need not necessarily be at the end of the distribution box 24, as shown in the drawing, but may be at the approximate center of the box or at any point between the center and the end shown in the drawing. The pivot should preferably be located at such a point that the extended member 27 will rest firmly upon screw member 28 with no chance for the box 24 becoming unbalanced. Such a condition would result in member 27 rising to contact with the wall 12 of the cooling tower at the top of the opening 26, in which case the water would run out at the left or lower end of the box 24. Provision could easily be made, however, for member 27 to be attached to screw member 28 so that this condition could not occur.

It will be obvious to those skilled in the art that many variations and modifications of the apparatus of my invention may be made and yet remain within the intended scope and spirit of my invention.

Having described my invention, I claim:

1. A heat exchanger comprising in combination upper liquid coolant container means having at least one outlet; perforate pressure control means obliquely disposed below said coolant container means outlet, whereby coolant material is collected therein in such a manner as to place said coolant material within said control means under successively greater pressures from one of its ends to the other, thereby providing a greater volume of coolant flow from that portion of said control means in which said coolant is maintained at greater pressures; heat exchange coils disposed below said control means, the inlet end of said coils being disposed below the end portion of said control means in which said coolant liquid is maintained at the greatest pressures, whereby said greater volume of coolant is caused to contact the hottest portion of said coils so as to maintain said coils at a temperature below that at which scale will form thereon; and lower coolant container means disposed below said heat exchange coils.

2. A heat exchanger comprising in combination upper liquid coolant container means having at least one outlet; perforate pressure control means pivotally fixed at one of its ends and movably supported at its other end beneath said coolant container outlet, whereby said control means is obliquely disposed below said coolant container so as to collect and maintain a quantity of said coolant within said control means under successively greater pressures from one of its ends to the other, thereby providing a greater volume of coolant flow from that portion of said control means in which said coolant is at greater pressures; heat exchange coils disposed below said control means, the inlet end of said coil being disposed below the end portion of said control means in which said coolant liquid is maintained at the greatest pressure, whereby said greater volume of coolant is caused to contact the hottest portion of said coils so as to maintain said coils at a temperature below that at which scale will form thereon; and lower coolant container means disposed below said heat exchange coils.

3. A heat exchanger comprising in combination upper liquid coolant container means having at least one outlet; perforate pressure control means pivotally fixed at one of its ends and movably supported at its other end beneath said coolant container outlet, whereby said control means is obliquely disposed below said coolant container so as to collect and maintain a quantity of said coolant within said control means under successively greater pressures from one of its ends to the other, thereby providing a greater volume of coolant flow from that portion of said control means in which said coolant is at greater pressures; coolant spreader means disposed below said pressure control means; heat exchange coils disposed below said spreader means and said control means, the inlet end of said coil being disposed below the end portion of said control means in which said coolant liquid is maintained at the greatest pressure, whereby a greater volume of coolant is caused to contact the hottest portion of said coils so as to maintain said coils at a temperature below that at which scale will form thereon; lower coolant container means disposed below said heat exchange coils; and adjustable screw means mounted above said lower coolant container so as to movably support the movable end of said pressure control means.

4. The heat exchanger of claim 3, wherein said upper coolant container means is provided with flow control means in said outlet.

SHELBY D. LAWSON.

REFERENCES CITED

The following references are of record in the file of this patent:

UNITED STATES PATENTS

| Number | Name | Date |
| --- | --- | --- |
| 90,242 | Dart | May 18, 1869 |
| 1,565,407 | Besson | Dec. 15, 1925 |
| 1,583,195 | Steere | May 4, 1926 |
| 1,628,487 | Bancel | May 10, 1927 |
| 1,829,744 | Fluor | Nov. 3, 1931 |
| 2,247,514 | Mart | July 1, 1941 |
| 2,369,264 | Brink et al. | Feb. 13, 1945 |